United States Patent

[11] 3,581,295

[72] Inventor Peter A. Denes
9101 Crestwood Ave. N.E., Albuquerque, N. Mex. 87112

[21] Appl. No. 822,337
[22] Filed Jan. 29, 1969
Division of Ser. No. 352,919, Mar. 18, 1964, Pat. No. 3,435,518
[45] Patented May 25, 1971

[54] MAGNETIC CORE MEMORY ARRAY
8 Claims, 6 Drawing Figs.

[52] U.S. Cl. .......... 340/174NC, 340/174M, 340/174AB, 340/174DC
[51] Int. Cl. .......... G11c 5/06, G11c 11/06
[50] Field of Search .......... 340/174 M; 29/604

[56] References Cited
UNITED STATES PATENTS
3,171,102 2/1965 Newman .......... 340/174

*Primary Examiner*—James W. Moffitt
*Attorney*—Spensley, Horn and Lubitz

ABSTRACT: A three-dimensional magnetic core memory system in which the noise effect of partially switched cores on the sensing wires are greatly diminished and the number of connecting points in the system is minimized.

INVENTOR.
Peter A. Denes
BY
Spensley, Horn & Jubas
Attys.

INVENTOR.
Peter A. Denes attys.

INVENTOR.
Peter A. Denes
BY attys

PETER A. DENES
INVENTOR.

BY Spensley & Horn
ATTORNEY

MAGNETIC CORE MEMORY ARRAY

This is a divisional application of my copending application Ser. No. 352,919, filed Mar. 18, 1964 and now U.S. Pat. No. 3,435,518.

BACKGROUND OF THE INVENTION

1. FIELD OF THE INVENTION

The present invention relates to three-dimensional magnetic core memory array commonly used to store information in computers and other data handling systems.

2. DESCRIPTION OF THE PRIOR ART

In the present or conventional magnetic core memory arrays, the information that is to be read into or out of a given core is accomplished by feeding half-current pulses of a given polarity simultaneously to the X and Y conductors associated with the core involved in such a direction as to drive the core to a predetermined state of saturation. When the magnetomotive force produces a change in the magnetic flux of the core, a pulse will be generated in a Z conductor passing through that core. When information is being read out of the array, this pulse is utilized by output devices connected to the Z output terminals associated with the particular core involved. One of the main problems with the present memory structures concerns the noise effect generated by partially switched cores on the sensing wire. It has been conventional to place the Z sensing wire in the same planes as the X and Y half current exciting wires and such placement is believed to be responsible for a high noise effect which is caused by partially switched cores. The present invention teaches structures in which the noise effect of partially switched cores on the sensing wires can be diminished. This can be accomplished by placement of the sensing wire perpendicular to the plane of the exciting wires.

SUMMARY OF THE INVENTION

One scheme for preventing unwanted core switching utilizes a three-dimensional magnetic core memory array having a plurality of spaced parallel planes of similarly oriented and positioned magnetic annular cores, the core in each plane being aligned in orthogonal rows and columns. The cores in each plane have an X-axis half current input conductor and a Y-axis half current input conductor threaded through a plurality of cores. A Z-axis output or sensing conductor is positioned principally perpendicular to the plane determined by the X and Y wires. The Z output or sensing conductors are threaded through a predetermined number of cores in such a manner that a given sensing wire does not cross any partially switched cores except the desired core. Actually, the sensing wire can cross as many partially switched cores as are safe not to produce a false signal and to diminish the number of connections.

The application of the sensing wire in the third dimension can be advantageously combined with any of the known methods to diminish noise and/or number of connections, with the effect that much less partially switched cores will generate signals in the sensing wire, compared with the situation when the sensing wires lay in the X-Y planes. One example, that of utilizing inhibiting currents, will be described in detail.

Other objects, advantages and features of the invention will become apparent upon making reference to the specification to follow, the claims and the drawings.

DESCRIPTION OF THE PREFERRED EMBODIMENTS

Figure 6:
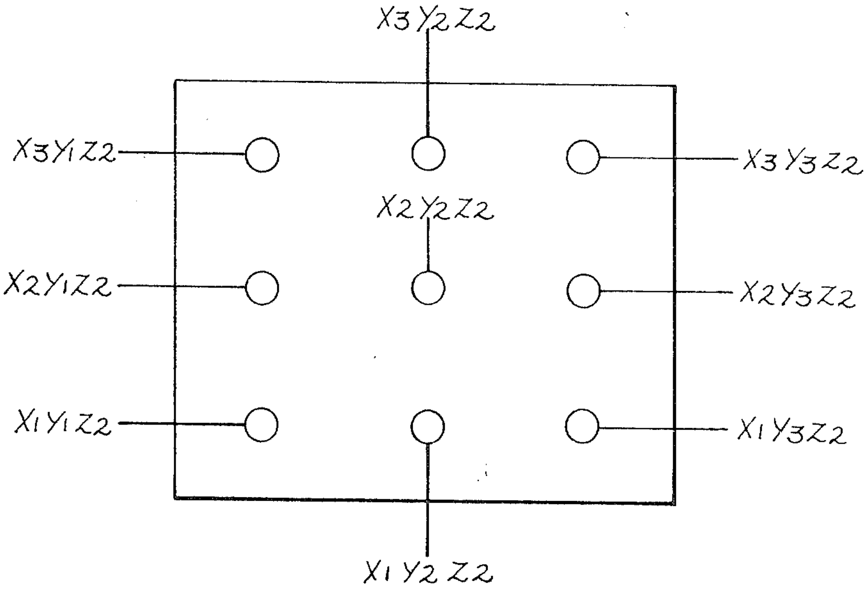
FIG. 6 is a diagrammatic view showing a plurality of cores in which sensing wires have been positioned substantially perpendicular to the plane of the exciting wires and is taken by way of illustration in a plane of a sensing wire called $Z_2$.

The inventive method for diminishing the noise effect of partially switched cores is shown in one of its simplest forms in FIG. 6. Each X wire (half current exciting wire), Y wire (half current exciting wire), and Z (sensing or output wire) connects one row of cores in series on three axes perpendicular to each other. The Z sensing wire in the array illustrated picks up only the signal of a fully switched core. There is no noise generated in the sensing wires by partially switched cores which get only one-half of the magnetizing current. The structure shown in FIG. 6 illustrates a 3 x 3 x 3 memory core array. Since the illustration of 27 cores in space may be confusing, FIG. 6 denotes the cores by the positions and coordinates they have on perpendicular X, Y and Z wire axes. Also, for purposes of illustration, the nine cores shown in FIG. 6 are taken along a plane in which the Z axis coordinate equals 2.

In the following illustrations [ ] will denote totally switched cores, and ( ) will denote partially switched cores. Those cores having neither [ ] nor ( ) are not switched at all.

If for example, it is desired to read the core $x_1y_2z_2$ each X, Y and Z wire goes through three cores. Thus the wires used in this example cross the following cores: the selected X wire goes through the cores $[x_1y_2z_2]$, $(x_2y_2z_2)$, $(x_3y_2z_2)$. The selected Y wire through the cores $(x_1y_1z_2)$, $[x_1y_2z_2]$, $(x_1y_3z_2)$. The core $[x_1yz_2]$, is totally switched while cores $(x_2y_2z_2)$, $(x_3y_2z_2)$, $(x_1y_1 z_2)$ and $(x_1y_3z_2)$ are half switched current receiving cores.

The selected Z wire goes through the cores $x_1y_2z_1$, $[x_1y_2z_2]$, $x_1y_{23}$. Thus, it can be seen that the switched core $[x_1y_2z_2]$ is the only core crossed by this particular Z wire and that none of the partially switched cores previously recited are so-crossed. Therefore, no noise of partially switched cores is picked up by the sensing wire Z.

The diminuation of noise of partially switched cores by the sensing wire can also be obtained by Z wires connecting, for example, 3×39 cores in the plane perpendicular through the X–Y plane and enclosing an angle of 45° with X and Y wires. Then the used Z wire would go through the following 9 cores: $x_1y_2z_1$, $x_2y_3z_1$, $x_2y_3z_2$, $[x_1y_2z_2]$, $x_1y_2z_3$, $x_2y_3z_3$, $x_3y_1z_3$, $x_3y_1z_2$, $x_3y_1z_1$. It may thus be observed that none of the partially switched cores recited previously is present in the latter series.

In practice a compromise as to the number of connecting terminals has to be considered inasmuch as economy would require as few X, Y and Z connecting terminals as possible. The more perfect the squareness ratio of the hysteresis loop of a core, the more partially switched cores can be allowed to affect the sensing wire without appreciable noise effects.

Only one core will be totally switched if each X wire is threaded through $n_x$ positions, each Y wire is threaded through $n_y{\cdot}n_z$ positions, and there is only one Z wire threaded through all the positions ("$n_x$ is defined as the number of X positions resulting from the intersection of Y–Z planes with the X-axis; "$n_y$" is defined as the number of X positions resulting from the intersection X-Z planes with the Y-axis and "$n_z$' is defined as the number of positions resulting from the intersection of X-Y planes with the Z-axis.)

The system of exciting more than one wire to fully switch a desired core is generally called a "coincidental current system" and the structures described herein are merely illustrative of some of the preferred embodiments of such a system.

As another example which further decreases the number of connections while totally switching only one core, the following array structure is considered. Assume that $n_x = n_y$ which is the usual case and $n_z$ is any even number ($n_z$ may be equal to or different from $n_x$ or $n_y$). There are then (0.5 $n_z$) X wires, each of which connect the core positions in the direction of an X row in the two adjacent Z direction planes which are, for example, planes 1, 2; 3, 4; ...; $n_{z11}$, $n_z$, respectively. There are also $(0.5n_z)$ Y wires connected similarly with the core positions of a Y row in two Z direction planes which are, for example, planes: $n_z$, 1; 2, 3; ...; $n_{z12}$, $n_{z11}$, respectively. The Y wires connect the cores with two adjacent Z direction planes and have a staggered relationship with X wires. There is then one Z wire going through all the core positions. Thus, for example, if a core $x_3$, $y_4$, $z_6$ (not shown) is to be switched and ready, half-switching currents are sent through the X wire going through all $y_4$ core positions in the Z direction planes 5 and 6, and through the Y wire going through all $X_3$ core positions in Z direction planes 6 and 7. Therefore, as can be determined by tracing the Z wire through the array, the only fully switched core will be $x_3$, $y_4$, $z_6$. One of the main features of the array structure is accomplished by threading the X and Y exciting wires so that they are in planes that are in staggered relationship with one another. NOte, that in the above example, the second exciting wire is threaded through the Z direction planes 3, 4 while the corresponding Y exciting wire is threaded through the Z direction planes 2, 3. The staggered relationship between X and Y wires are not dependent on whether $n_z$ is an odd or even number.

If $n_z$ is an odd number, there are $0.5\ (n_z-1)$ X wires each of which connect the core positions in the direction of an X row in two Z direction planes which are: 1, 2; 3, 4; ...; $n_{z12}$, $n_{z11}$; respectively, and one X wire in the same row in Z direction planes $n_z$. Similarly, $0.5\ (n_z-1)$ Y wires connect the core positions of a Y row in the two Z direction planes which are for example planes: $n_z$, 1; 2, 3; ...; $n_{z13}$, $n_{z12}$; respectively, and one Y wire in the same Y row in Z direction planes $n_{z11}$. There is one Z wire going through all the core positions. If again the core $x_3y_{46}$ is to be switched and read, half-switching currents are sent through the X wire going through all $Y_4$ core positions in Z direction planes 5 and 6, and through all $X_3$ core positions in Z direction planes 6 and 7. In both cases, $x_3y_4z_6$ will be the only totally switched core.

If the noise of more partially switched cores can be permitted, the Y wire can connect all the core positions in the Z direction planes: $n_z$, 1; 2, 3; ...; . Still $x$ $x_3y_4z_6$ will be the only totally switched core.

Using the above-mentioned Y wire systems, the number of connections to the X wires can be further diminished if the X wires connect core positions in the direction of an X row in more than two Z direction planes. e.g., still $x_3y_4z_6$ will be the only totally switched core, if one X wire connects all the core positions in the direction of an X row in pairs of alternate Z direction planes, for example, planes: 1, 2; 5, 6; 9, 10; ...; and another X wire connects the core positions of the same X row in the remaining Z direction planes: 3, 4; 7, 8; 11, 12; ...;. If $n_x$ is divisible by 4, these are the only two X wires per X row. If $n_z$ is not divisible by 4, the remaining X wires will also have to be connected according to the discussed principles. Any number of combinations of the above-described systems can be applied.

It should be understood that the X, Y and Z wires and axes are labeled as inhibiting in the descriptions merely for purposes of identification. However, the principles of the invention apply to any three dimensional core array utilizing a coincident current system for switching cores regardless of the nomenclature or labels given to the wires or axes.

The avoidance of completely switching more than one core can also be achieved by employing inhibiting current pulses as will be described hereinbelow in conjunction with the three-dimensional array. The three-dimensional arrays described herein make possible much larger possibilities of combinations to improve the ratio of total numbers of connecting terminals to total number of memory cores. The number of possible combinations is unlimited and can be adjusted to best fit a particular application or design.

Figure 1:
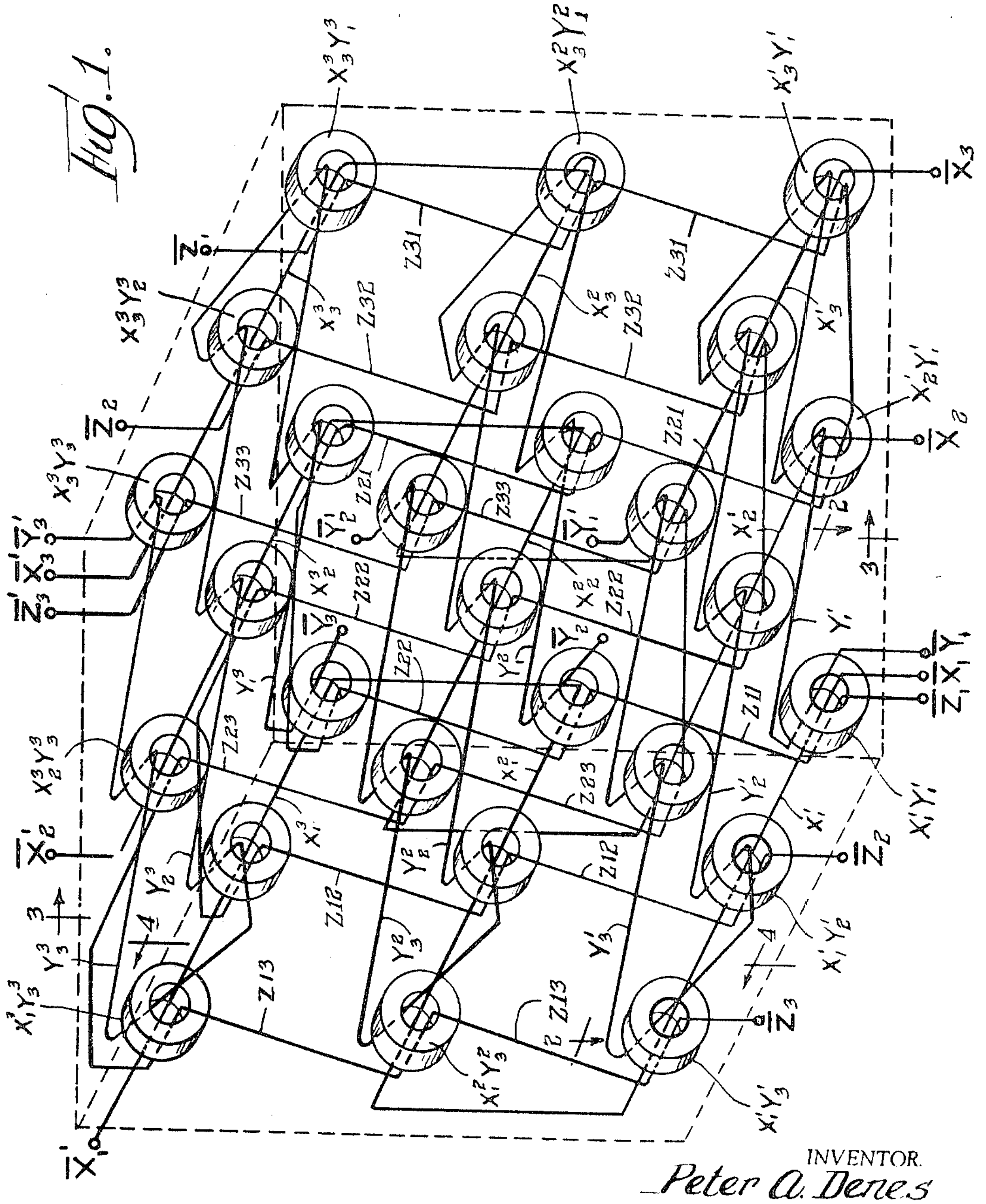
FIG. 1 is a perspective view of a multiplanar magnetic core memory array.

FIG. 1 illustrates a multiplanar configuration of the inventive three-dimensional array.

Figures 2, 3:
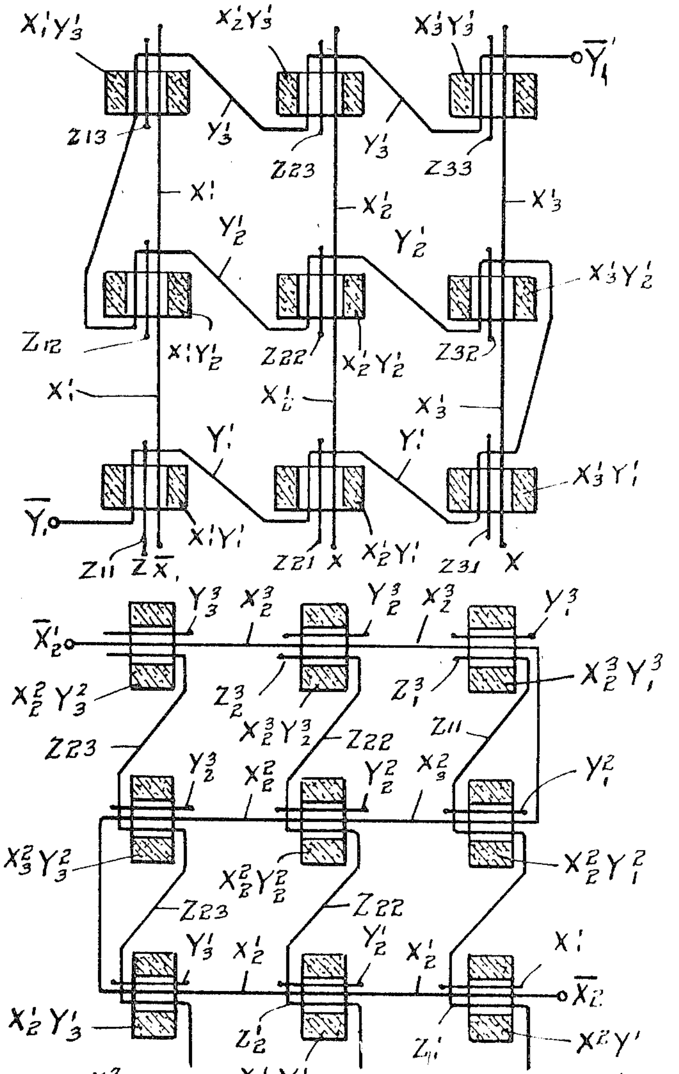
FIGS. 2—4 are respectively sectional views of the array of FIG. 1, taken respectively along the reference lines 2–2, 3–3 and 4–4.
Figure 4:
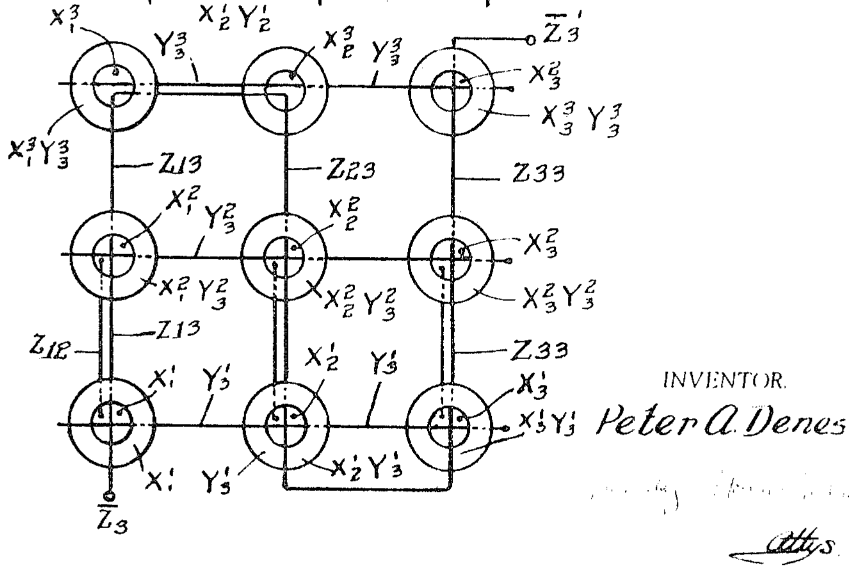

FIGS. 2 and 4 clearly show how the X and Y exciting wires and Z output conductors are threaded through the various cores so that the Z output conductors are substantially perpendicular to the planes defined by the X and Y wires. The technique shown has the advantages previously described in the discussion of FIG. 6.

More specifically, the magnetic core memory array illustrated in FIG. 1 is a three plane array with nine cores per plane arranged most advantageously in orthogonal rows and columns of three cores in each row and column. The corresponding cores in the various rows and columns of the three planes of the array are most advantageously in vertical alignment. The cores are identified in the drawings by reference characters X and Y and with subscript numbers related to the X and Y half current input conductors passing therethrough and superscript numbers identifying the particular plane of the array in which the cores are located. An X-axis half current conductor extends through each of the cores in the same column in each plane of the array, and each such conductor is identified by the main reference character X with a subscript number corresponding to the numbers 1, 2 or 3 of the row in which the cores involved are located and row superscript number 1, 2 or 3 corresponding to the plane in which the cores involved are located, and a superscript number 1, 2 or 3 corresponding to the horizontal plane in which the cores involved are located. Similarly a Y half current conductor extends through the core in each row of cores in each plane of the array. Each Y half current conductor is identified by the reference character Y with a subscript number 1, 2 or 3 corresponding to the row and a superscript number 1, 2 or 3 corresponding to the plane in which the cores involved are located. A Z-axis output conductor extends through corresponding vertically aligned cores in the various planes of the array. Each Z-axis output conductor is identified by the reference character Z with two superscript numbers, the first identifying the column and the second identifying the row in which the cores involved are located. The configuration of the cores and the manner in which the cores and wires are shown in detail in FIGS. 2—4.

There are thus in each plane of the array, three X-axis half current, three Y-axis half current and nine Z-axis output conductors.

In accordance with the one aspect of the present invention, the various X, Y and Z conductors passing through the various cores are connected in series in such a way as to provide a minimum number of usable input and output points to the matrix. To this end, in the illustrated embodiment of the invention, the X half current conductors in the same No. 1 columns of the various planes of the array are connected in series across a pair of input terminals $\bar{X}_1-\bar{X}_{1'}$. Likewise, the $X_2$ half current conductors in the same No. 2 columns of the various planes of the array are connected in series between a pair of input terminals $\bar{X}_2-\bar{X}_2'$. Similarly, all of the $X_3$ half current conductors in the No. 3 columns of the various planes of the array are connected in series between a pair of input terminals $\bar{X}_3-\bar{X}_3'$.

The Y half current conductors in the bottom No. 1 plane of the array are connected in series between a pair of input terminals $\bar{Y}_1-\bar{Y}_1'$. The Y half current conductors of the middle No. 2 plane of the array are connected in series across a pair of input terminals $\bar{Y}_2-\bar{Y}_2'$. The Y half current conductors in the upper No. 3 plane of the array are connected in series across a pair of input terminals $\bar{Y}_3-\bar{Y}_3'$.

The Z output conductors $Z_{11}-Z_{21}-Z_{31}$ which are in the forwardmost vertical plane of the array (viewed in FIG. 1) are connected in series across a pair of input terminals $\bar{Z}_1-\bar{Z}_1'$, the Z output conductors $Z_{12}-Z_{33}-Z_{32}$ in the same intermediate vertical plane of the array are connected in series across a pair of input terminals $\bar{Z}_2-\bar{Z}_2'$, and the Z output conductors $Z_{13}-Z_{23}-Z_{33}$ in the rearwardmost vertical plane of the array are connected in series across a pair of input terminals $\bar{Z}_3-\bar{Z}_3'$.

In the particular circuit illustrated in the drawing, all of the primed input and output terminals $\bar{X}_1'-\bar{X}_2'-X_3'$, $\bar{Y}_1'-\bar{Y}_2'-\bar{Y}_3'$ and $\bar{Z}_1'-\bar{Z}_2'-\bar{Z}_3'$ are respectively grounded terminals.

The manner in which the various individual X, Y and Z conductors are connected in series with the various $\overline{X}_1-\overline{X}_2$ $\overline{X}_3$, $\overline{Y}_1-\overline{Y}_2-\overline{Y}_3$ and $\overline{Z}_1$ $-\overline{Z}_2-\overline{Z}_3$ terminals of the array can be summarized as follows:

$\overline{X}_1=X_1^1+X_2^1+X_3^1$
$\overline{X}_2=X_2^1+X_2^2+X_2^3$
$\overline{X}_3=X_1^3+X_2^3+X_3^3$
$\overline{Y}_1=Y_1^1+Y_1^2+Y_1^3$
$\overline{Y}_2=Y_1^2+Y_2^2+Y_3^2$
$\overline{Y}_3=Y_1^3+Y_2^3+Y_3^3$
$\overline{Z}_1=Z_{11}+Z_{21}+Z_{31}$
$\overline{Z}_2=Z_{12}+Z_{22}+Z_{32}$
$\overline{Z}_3=Z_{13}+Z_{23}+Z_{33}$ Or, in the general case having $n^3$ cores in the array:

$\overline{X}_k=X_1^k+X_2^k+...+X_n^k$ $(k=1,2,...,n)$
$Y_k=Y_1^k+Y_2^k+...+Y_n^k$ $(k=1,2,...,n)$
$\overline{Z}_k=Z_{1k}+Z_{2k}+...+Z_{nk}$ $(k=1,2,...,n)$ An array having $n^3$ cores thus has only $6n$ connections, each $2n$ for the $\overline{X}$, $\overline{Y}$ and $\overline{Z}$ terminals. The $\overline{X}$ and $\overline{Y}$ terminals carry the half current pulses in accordance with the well-known coincidental current memory principle.

As is conventional in magnetic core memory arrays, to read information into or out of a given core half current pulses of a given polarity must be simultaneously fed to the X and Y conductors associated with the core involved in a direction to drive the core to the same predetermined state of saturation. If the magnetomotive force produces a change in the magnetic flux of the core, a pulse will be generated in the Z conductor passing through the core. When the information is being read out of the array, this pulse is utilized by output devices connected to the Z output terminals associated with the particular core involved.

Figure 5:
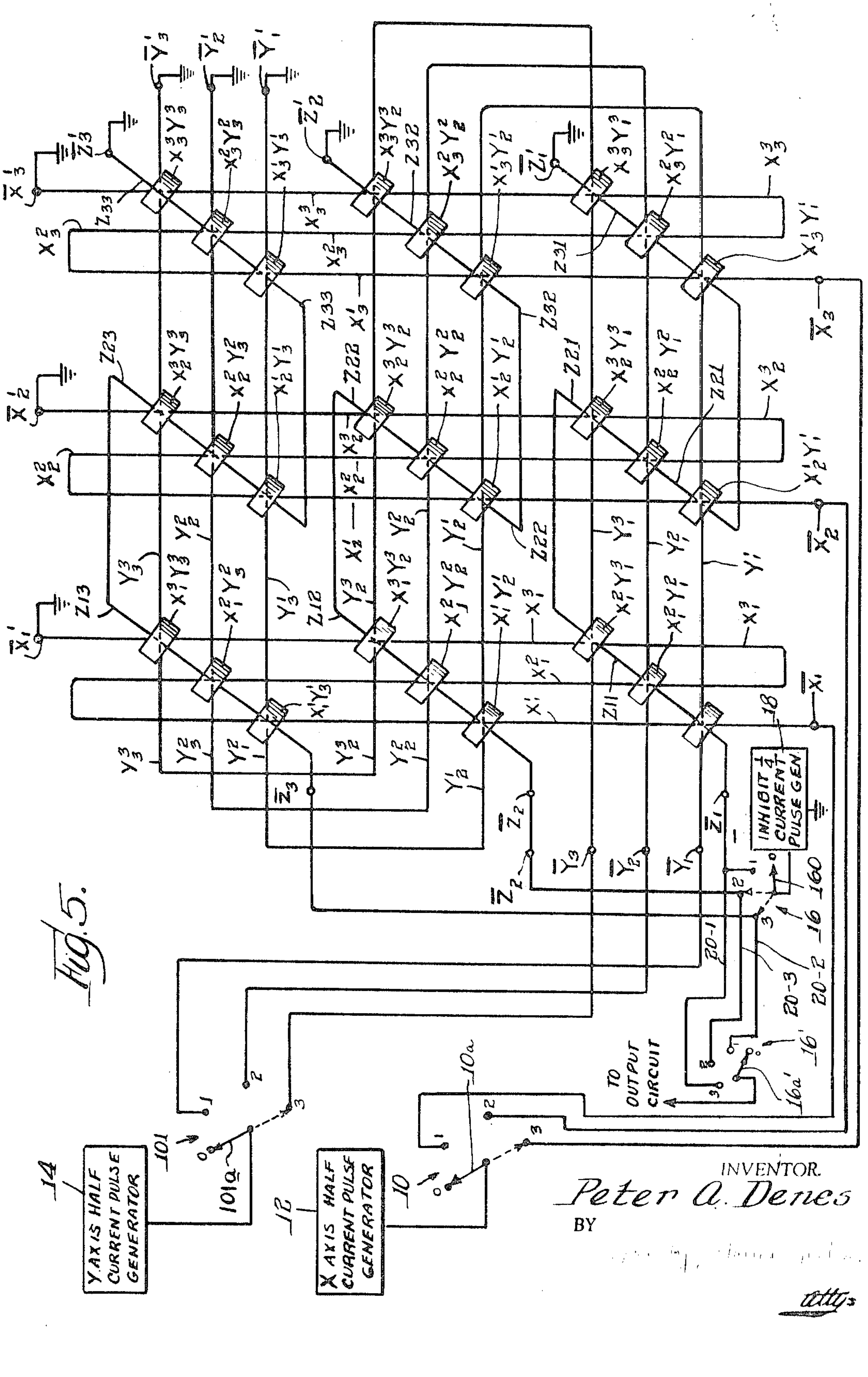
FIG. 5 is a diagrammatic view of the magnetic core memory array of FIG. 1 with exemplary connections thereof to various input and output circuits used to read information into and out of the array.

It should be understood that the inventive three dimensional array can be utilized with other techniques known for diminishing noise and/or the number of connection points. This will result in less partially switched cores to generate noise in the output wires then when such other techniques are used with the output wires in the same plane as the exciting wires. FIG. 5 shows the inventive three dimensional memory array in combination with an inhibiting current technique used for diminishing the noise caused by partially switched cores.

In FIG. 5 means are provided for selectively feeding half current pulses to the approximate $\overline{X}$ and $\overline{Y}$ signal input terminals for storing information in or reading information out of the array. This may be accomplished by means of a mechanical (or electronic) switch 10 which, as illustrated, has four stationary contacts 0, 1, 2 and 3. Contact numbers 1, 2 and 3 are respectively connected to the input terminals $\overline{X}_1$, $\overline{X}_2$ and $\overline{X}_3$. The switch 10 has a wiper contact 10*a* adapted to make selective engagement with the contacts 0 through 3. The wiper 10*a* is connected to the output of a suitable source of half current pulses 12.

Another mechanical (or electronic) switch 101 is provided which, as illustrated in FIG. 5 has four stationary contacts 0, 1, 2 and 3. Stationary contacts 1, 2 and 3 are respectively connected to the input terminals $\overline{Y}_1$, $\overline{Y}_2$ and $\overline{Y}_3$. The switch 101 has a wiper 101*a* adapted to make selective engagement with any of the contacts 0 through 3. The wiper 101*a* is connected to a half current pulse source 14 whose pulses are synchronized with the pulses generated by the pulse source 12. It is apparent that by properly positioning the wipers 10*a* and 101*a* that a particular core in the selected row and column of the array can be selected for read-in or readout purposes. However, due to the manner in which the X, Y and Z conductors are connected in series, there will be an additional core which simultaneously receives half current pulses which produce aiding magnetomotive forces. The core which is not selected is located in each instance, however, in a part of the array which has a different Z axis conductor than the selected core. The unwanted core is made nonresponsive to the half current pulse by feeding an inhibit pulse each having an amplitude less than the half current value which will reduce the net magnetomotive force on the unwanted core necessary to drive the core to saturation and will be less than the magnitude required to switch another core having only one-half current pulse fed thereto which produces a magnetomotive force in the same direction as the inhibit pulse. To this end, the $\overline{Z}_1$, $\overline{Z}_2$, and $\overline{Z}_3$ terminals of the array may be respectively connected to a section 16 of a multiple mechanical (or electronic) switch which, as illustrated, has contacts 0, 1, 2 and 3. Contacts 1, 2 and 3 are respectively connected to the $\overline{Z}_1$, $\overline{Z}_2$ and $\overline{Z}_3$ terminals. The switch 16 has a wiper 16*a* adapted to make selective contact with any of the contacts 0 through 3. The wiper 16*a* is connected to the output of an inhibit one-quarter current pulse generator 18 which generates pulses at one-half the amplitude of the half current pulse generators 12 and 14.

The $\overline{Z}_1$, $\overline{Z}_2$ and $\overline{Z}_3$ output terminals are also connected by conductors 20–1, 20–2 and 20–3 to a second section 16' of the multiple mechanical (or electronic) switch, having a wiper 16*a'* and contacts 0, 1, 2 and 3. Conductors 20–1, 20–2, and 20–3 are respectively connected to terminals 3, 2 and 1 so that as the wipers 16*a* and 16*a'* are operated simultaneously the output terminal not used for inhibit purposes if fed through wiper 16*a'* to the output circuit so that the output of the interrogated core is read out from the matrix.

The need for the inhibiting pulses can best be understood by specific examples. Thus consider that we wish to switch the core $X_2^3Y_3^2$. For this purpose we send half current pulses through terminals $\overline{X}_2$ and $\overline{Y}_2$, in the direction that they add up in core $X_2^2Y_3^2$ to switch it. We use $\overline{Z}_3$ as a sensing terminal. Terminal $\overline{Z}_3$ registers the switching signal voltage of core $X_2^2Y_3$. However, it picks up the noise voltage of the following cores: in the crossing line of the planes associated with terminal $\overline{X}_2$ and terminal $\overline{Z}_3$, of the cores $X_2^1Y_3^1$ and $X_2^3Y_3^3$, or, in the general case, of the cores $X_2Y_3^k$ ($k$=1, 3, 4, ....., $n$; $k$=2 that being the switched core); further, in the crossing line of the planes defined by $\overline{Y}_2$ and $\overline{Z}_3$, of the cores $X_1^2Y_3^2$ and $X_3^2Y_3$ $^2$, or, in the general case, of the cores $X_k^2Y_2^3$ ($k$=1, 3, 4, ..., $n$; $k$= 2).

These noises cancel each other with the possible maximum exception of two noise voltages in each series. In two neighboring cores $X_2^kY_3^k$ and $X_2^{k+1}Y_3^{k+1}$ the sensing wires $Z_{23}$ has the same direction; however, the direction of the half current pulse in wire $X_2^k$ is opposite to the direction of the half current pulse in wire $X_2^{k+1}$, hence the induced noise voltages are opposite in the wire $Z_{23}$ and grossly cancel each other. Similarly, in two neighboring cores $X_k^2Y_3^2$ and $X_{k+1}^2Y_2^3$ the half current pulse flowing through the wire $Y_3^2$ has the same direction; however, one is generating a noise voltage in wire $Z_{k,3}$ and the other in wire $Z_{k+1,3}$ which flow in opposite directions and grossly cancel each other.

The half of the remaining $\overline{Z}$ terminals are used for inhibition of unwanted switching of cores. If no inhibition would be applied, sending half current pulses through terminals $\overline{X}_2$ and $\overline{Y}_2$, besides the core $X_2^2Y_3^2$ , the core $X_2^2Y_1^2$, and in the general case, all cores $X_2^2Y_{2k+1}^2$ ($k$=0, 2, 3, ...; $k<n/2$) would switch, because the two half current pulses flow in these cores in the same directions, while in the cores $$X_2^2\ Y_{2k}^2\ \left(k=0,\ 2,\ 3,\ .\ .\ .\ ;\ k<\frac{n+1}{2}\right)$$

the two half current pulses flow in the opposite directions and cancel each other.

Hence we use the terminals $\overline{Z}_1$, respectively in the general case, the terminals $\overline{Z}_{2k+1}$ ($k$=0,2,3,$k<n/2$ for inhibition and we send a current pulse through them which is only half of the half current pulses in terminals $\overline{X}_2$ and $\overline{Y}_2$ and is of opposite direction to them when they flow through the cores $X_2^2Y_{2k+1}^2$ ($k$=2, 3, ...; $k<n/2$). Consequently, these cores receive only three-quarter of the pulse value which would be necessary to switch them and they remain in their original state.

The one-fourth inhibiting current pulse causes no switching in the other cores being in the core planes associated with the terminals $\overline{Z}_{2k+1}$ ($k$=0,2,3,$k<n/2$) either; the total current pulse in them is either one-fourth or three-quarter, less than needed for switching. Among the cores being in the crossing lines of the core planes associated with terminals $\overline{X}_2$ and $\overline{Z}_{2k+1}$ ($k$=2,3,$k<n/2$), the cores $X_2^{2i+1}Y_{2k+1}^{2i+1}$ ($i$=0, 1, 2, ...; $i<n2$) get three-quarter current pulse and the cores $$X_2^{2i}\ Y_{2k+1}^{2i}\left(i=0,\ 1,\ 2,\ .\ .\ .\ ;<\frac{n+1}{2}\right)$$

get one-quarter current pulse.

Similarly, among the cores being in the crossing lines of the planes defined by terminals $\overline{Y}_2$ and terminals $\overline{Z}_{2k}+1$ ($k$=0, 2, 3, ...; $k<n/2$), the cores $X_{2i+1}^2Y_{2k+1}^2$ ($i$=0, 1, 2, ...; $i<n/2$) get three-quarter current pulse and the cores $$X_2 i^2\ Y_{2k+1}^2\left(i=0,\ 1,\ 2\ .\ .\ .\ ;\ i<\frac{n+1}{2}\right.$$

get one-quarter current pulse.

This system represents a memory array with minimum connection points, actually, the ratio of connection to bits is $6/n^2$ which is a very small number if $n$ is growing.

It should be understood that numerous modifications may be made in the exemplary arrays described above without deviating from the broader aspects of the invention. Thus, it is also apparent that the steps described in connection with the exemplary array make the wiring of almost any conceivable memory core array possible. The reduction of noise effect is accomplished by placing the Z sensing wires essentially perpendicular to the plane determined by the half current exciting wires X and Y. By utilizing the structures disclosed herein, and known equivalents thereof, the complete switching of more than one core can be avoided and much larger possibilities of combinations to improve the ratio of total number of connecting terminals to total number of memory cores is achieved. 10,1,2,

I claim:

1. A three-dimensional magnetic core memory array having a low noise effect comprising:
   a plurality of spaced parallel planes of similarly oriented and positioned magnetic annular cores, the cores in each plane being aligned in orthogonal rows and columns, the cores in each plane having at least one X-axis half current input conductor threading through a plurality of cores and at least one Y-axis half current input conductor threading through a plurality of cores, and at least one Z-axis output conductor, said Z-axis conductor being substantially perpendicular to the planes determined by said X and Y conductors, and, said Z output conductor being threaded through cores enclosing an angle of 45° with the X and Y conductors.

2. A three-dimensional magnetic core memory array having low noise effect comprising:
   a plurality of spaced parallel planes of similarly oriented and positioned magnetic annular cores, the cores in each plane being aligned in orthogonal rows and columns, the cores in each plane having at least one X-axis half current input conductor threading through a plurality of series arranged cores and at least one Y-axis half current input conductor threading through a plurality of series arranged cores, and at least one Z-axis output conductor, said Z-axis conductor being substantially perpendicular to the planes determined by said X and Y conductors, said Z output conductor being threaded through a plurality of series arranged cores and a coincidental current system used for excitation of the cores in which a selected Z-axis output conductor will cross only a desired core without crossing any unwanted excited cores on said X and Y conductors.

3. A three-dimensional magnetic core memory array having low noise effect and a reduced number of connecting points for reading a fully switched core comprising:
   a plurality of spaced parallel planes of similarly oriented and positioned magnetic annular cores, the cores in each plane being aligned in orthogonal rows and columns, the cores in each plane having at least one X-axis half current input conductor threading through a plurality of series arranged cores and at least one Y-axis half current input conductor threading through a plurality of series arranged cores, and at least one Z-axis output conductor, said Z-axis conductor being substantially perpendicular to the planes determined by said X and Y conductors, said Z output conductor being threaded through a plurality of series arranged cores in which said three dimensional array has:
   a. an even number of core plane positions in the Z-axis direction, the number of the X conductors equaling one-half the number of the core plane positions intersecting the Z-axis, said X conductors connecting all the cores in X rows in two adjacent Z direction planes;
   b. the number of Y conductor equaling one-half the total number of core plane positions intersecting the Z-axis, said Y conductors connecting all the cores in Y rows in two adjacent Z direction planes except that the cores in Y rows in a last Z direction plane and the cores in Y rows in a first Z direction plane are joined by the same Y conductors; and
   c. a single Z output conductor connecting all the cores in the array, whereby a reduced number of array connecting points is obtained for reading a fully switched core on a Z output conductor and whereby said X and Y conductors are threaded in a staggered relationship to each other.

4. The magnetic memory array of claim 3 in which the number of core plane positions intersecting the X and Y axes are equal.

5. A three-dimensional magnetic core memory array having low noise effect and a reduced number of connecting points for reading a fully switched core comprising:
   a plurality of spaced parallel planes of similarly oriented and positioned magnetic annular cores, the cores in each plane being aligned in orthogonal rows and columns, the cores in each plane having at least one X-axis half current input conductor threading through a plurality of series arranged cores and at least one Y-axis half current input conductor threading through a plurality of series arranged cores, and at least one Z-axis output conductor, said Z-axis conductor being substantially perpendicular to the planes determined by said X and Y conductors, said Z output conductor being threaded through a plurality of series arranged cores in which said three dimensional array has:
   a. an odd number of core positions in the Z-axis direction, a number of first X conductors equaling one-half of the total number of core plane positions intersecting the Z-axis minus one position, said first X conductors, connecting the cores in X rows in two adjacent Z direction planes up to and including the next to last Z direction planes, second X conductors connecting the cores in X rows in the last Z direction plane;
   b. a number of first Y conductors equaling one-half of the total number of core plane positions intersecting the Z-axis minus one position, said first Y conductors connecting all of the cores in Y rows in two adjacent Z direction planes except that the cores in Y rows in a last Z direction plane and the cores in Y rows in a first Z direction plane are joined by the same Y conductors, second Y conductors connecting the cores in the next to last Z direction plane; and
   c. a single Z output conductor connecting all the cores in the array, whereby a reduced number of array connecting points is obtained for reading a fully switched core on the Z output conductor, and whereby said X and Y conductors are threaded in a staggered relationship to each other.

6. The magnetic memory array of claim 5 in which the number of core plane positions intersecting the X- and Y-axis are equal.

7. A three-dimensional magnetic core memory array having low noise effect and a reduced number of connecting points for reading a fully switched core comprising:

a plurality of spaced parallel planes of similarly oriented and positioned magnetic annular cores, the cores in each plane being aligned in orthogonal rows and columns, the cores in each plane having at least one X-axis half current input conductor threading through a plurality of series arranged cores and at least one Y-axis half current input conductor threading through a plurality of series arranged cores, and at least one Z-axis output conductor, said Z-axis conductor being substantially perpendicular to the planes determined by said X and Y conductors, and, said Z output conductor being threaded through a plurality of series arranged cores in which said three-dimensional array has:

a. a first set of X conductors connecting the cores in X rows in alternate pairs of Z direction planes and a second set of X conductors connecting all the cores in X rows in the remaining alternate alternate pairs of Z direction planes;

b. a number of Y conductors connecting all the cores in Y rows in two adjacent Z direction planes except that the cores in Y rows in a last Z direction plane and the cores in Y rows in a first Z direction plane are joined by the same Y conductors; and c. a single Z output wire connecting all the cores in the array, whereby a reduced number of connecting points is obtained for reading a fully switched core on the Z output wire and whereby said X and Y conductors are threaded in a staggered relationship to each other.

8. The magnetic memory array in claim 7 having a number of core planes intersecting the X-axis divisible by four and having two X conductors for each X direction row.